(12) United States Patent
Oishi et al.

(10) Patent No.: US 11,374,261 B2
(45) Date of Patent: Jun. 28, 2022

(54) ELECTROCHEMICAL DEVICE AND SOLID-STATE LITHIUM ION RECHARGEABLE BATTERY

(71) Applicant: TDK CORPORATION, Tokyo (JP)

(72) Inventors: Masahiro Oishi, Tokyo (JP); Hisaji Oyake, Tokyo (JP); Hiroshi Sato, Tokyo (JP); Hiroko Takayanagi, Tokyo (JP); Gakuho Isomichi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 642 days.

(21) Appl. No.: 16/321,783

(22) PCT Filed: Aug. 4, 2017

(86) PCT No.: PCT/JP2017/028450
§ 371 (c)(1),
(2) Date: Sep. 23, 2019

(87) PCT Pub. No.: WO2018/026009
PCT Pub. Date: Feb. 8, 2018

(65) Prior Publication Data
US 2020/0014070 A1 Jan. 9, 2020

(30) Foreign Application Priority Data
Aug. 4, 2016 (JP) .............................. JP2016-153709

(51) Int. Cl.
*H01M 10/0585* (2010.01)
*H01M 10/0525* (2010.01)
(Continued)

(52) U.S. Cl.
CPC ........ *H01M 10/0585* (2013.01); *H01G 11/56* (2013.01); *H01M 10/0525* (2013.01); *H01M 10/0562* (2013.01); *H01M 2300/0068* (2013.01)

(58) Field of Classification Search
CPC ......... H01M 10/0585; H01M 10/0525; H01M 10/0562; H01G 11/56
See application file for complete search history.

(56) References Cited

U.S. PATENT DOCUMENTS

2007/0202400 A1 8/2007 Yoshida et al.
2009/0197182 A1 8/2009 Katoh

FOREIGN PATENT DOCUMENTS

JP 2000-311710 A 11/2000
JP 3373242 B2 2/2003
(Continued)

OTHER PUBLICATIONS

Oct. 17, 2017 International Search Report issued in International Patent Application No. PCT/JP2017/028450.
(Continued)

*Primary Examiner* — Jayne L Mershon
(74) *Attorney, Agent, or Firm* — Oliff PLC

(57) ABSTRACT

An electrochemical device has a laminated body including: a positive electrode; a negative electrode; and a solid electrolyte sandwiched between the positive electrode and the negative electrode, wherein the laminated body contains water, a content of the water contained in the laminated body is 0.001 mass % or more and less than 0.3 mass % with respect to the laminated body, a part of the water is a bound water bonding with a constituent of the laminated body, and a ratio of the bound water in the water is 50% or more and 90% or less.

18 Claims, 1 Drawing Sheet

(51) Int. Cl.
*H01M 10/0562* (2010.01)
*H01G 11/56* (2013.01)

(56) References Cited

FOREIGN PATENT DOCUMENTS

| | | | |
|---|---|---|---|
| JP | 2007-258148 | A | 10/2007 |
| JP | 2008-243560 | A | 10/2008 |
| JP | 2009-181921 | A | 8/2009 |
| JP | 5078120 | B2 | 11/2012 |
| JP | 5122847 | * | 1/2013 |
| JP | 2015-076324 | A | 4/2015 |
| WO | 2012/029641 | A1 | 3/2012 |

OTHER PUBLICATIONS

Feb. 7, 2022 Office Action issued in Chinese Patent Application No. 201780047815.7.

* cited by examiner

ELECTROCHEMICAL DEVICE AND SOLID-STATE LITHIUM ION RECHARGEABLE BATTERY

TECHNICAL FIELD

The present invention relates to an electrochemical device and a solid-state lithium ion rechargeable battery.

Priority is claimed on Japanese Patent Application No. 2016-153709, filed Aug. 4, 2016, the content of which is incorporated herein by reference.

BACKGROUND ART

An electrolyte serving as a medium for movement of ions is used in various applications such as batteries, capacitors, condensers, and the like. The electrolyte includes an electrolytic solution using a liquid and a solid electrolyte using a solid. Liquid electrolyte has a problem such as liquid leakage. For example, if the liquid leakage occurs in a lithium ion secondary battery, it causes ignition. Therefore, attention has been drawn to electrochemical devices using solid electrolytes without concern of the liquid leakage or the like.

An electrochemical device using a solid electrolyte has a problem that its output is small as compared with an electrochemical device using an electrolytic solution. For that reason, various studies are under way to increase the output of the electrochemical device.

For example, Patent Literature 1 describes a laminated battery in which a positive electrode, a solid electrolyte, and a negative electrode are laminated to achieve a high energy density. In addition, Patent Literature 2 describes a solid-state battery using a phosphate-based solid electrolyte in which reduction of ion conductivity is suppressed by substituting a part of lithium with another device.

In addition, Patent Literature 3 describes a solid-state battery in which water is contained in the internal electrode body containing a solid electrolyte in a ratio of 1.3 to 10 mass %. It is described that charging and discharging characteristics are improved by containing a predetermined amount of water.

RELATED ART DOCUMENT

Patent Literature

Patent Literature 1: Japanese Patent (Granted) Publication No 373242 (B)

Patent Literature 2: Japanese Unexamined Patent Application, First Publication No. 2015-76324 (A)

Patent Literature 3: Japanese Patent (Granted) Publication No. 5078120 (B)

DISCLOSURE OF INVENTION

Problems to be Solved by the Invention

However, in the batteries described in Patent Literatures 1 to 3, operation cannot be maintained when a high voltage is applied.

For example, in the solid-state battery described in Patent Literature 3, water is contained in the internal electrode body at a ratio of 1.3 to 10 mass %. When such an amount of water is contained in the internal electrode body, the environment to which the internal electrode body is exposed becomes very wet. In Patent Literature 3, in some cases, water is dripped into the battery case, and it can be said that the internal electrode body is immersed in water.

In such a humid environment, it is conceivable that water acts as a carrier of conduction rather than a solid electrolyte. However, when water has a large contribution to conduction, the probability of a short circuit of the device increases.

In Examples and Comparative Examples of Patent Literature 3, the initial discharge capacity is increased by containing 1.3 mass % or more of water. However, only a good example is shown, and it is not always possible to maintain the operation stably. Further, Patent Literature 3 merely shows the result of one device, and it is considered difficult to stably obtain operable devices.

The present invention has been made in view of the above problems, and it is an object of the present invention to provide an electrochemical device capable of maintaining an operation when a high voltage is applied within a range of a water content that can be operated stably.

Means for Solving the Problems

The inventors of the present invention have found that by impregnating a laminated body with a predetermined amount of water, the electrochemical device stably achieves high output.

That is, in order to solve the above-described problem, the following means are provided.

An aspect of the present invention is an electrochemical device having laminated body including: a positive electrode; a negative electrode; and a solid electrolyte sandwiched between the positive electrode and the negative electrode, wherein the laminated body contains water, a content of the water contained in the laminated body is 0.001 mass % or more and less than 0.3 mass % with respect to the laminated body, a part of the water is a bound water bonding with a constituent of the laminated body, and a ratio of the bound water in the water is 50% or more and 90% or less.

In the above-described aspect of the present invention, the content of the water contained in the laminated body may be 0.07 mass % or more and 0.25 mass % or less with respect to the laminated body.

In the above-described aspect of the present invention, the content of the bound water may be 0.005 mass % or more and 0.2 mass % or less.

In the above-described aspect of the present invention, the content of the bound water may be 0.04 mass % or more and 0.18 mass % or less.

In addition, in the above-described aspect of the present invention, the ratio of the bound water in the water is 65% or more and 90% or less.

In the above-described aspect of the present invention, the solid electrolyte is a phosphate solid electrolyte.

Other aspect of the present invention is a solid-state lithium rechargeable battery including the electrochemical device according to the aspect of the present invention described above.

In the above-described other aspect of the present invention, relative densities of: a pair of a positive electrode layer and a negative electrode layer; and a solid electrolyte layer provided between the pair of the electrode layers may be 80% or more.

Effect of the Invention

According to the electrochemical device of one embodiment of the present invention, operation can be maintained when a high voltage is applied.

EMBODIMENTS

Figure 1:
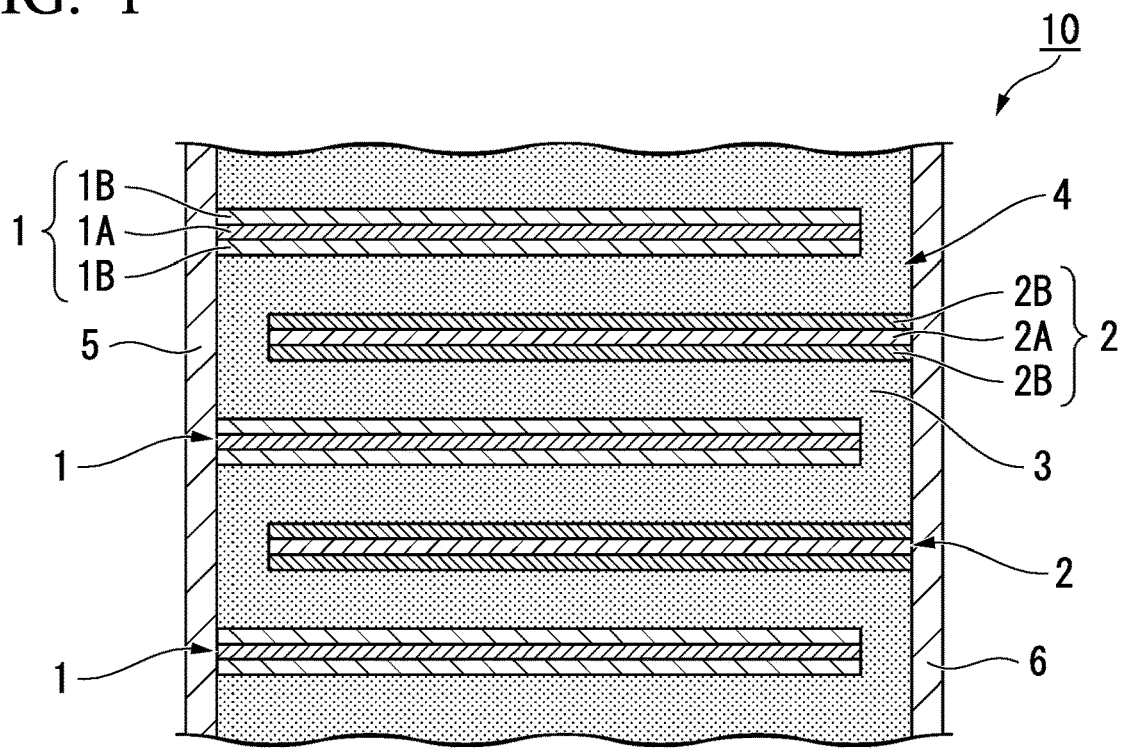
FIG. 1 is a cross-sectional schematic view showing an enlarged main part of a solid-state battery according to the first embodiment.

Hereinafter, the present invention will be described in detail with reference to the drawings as appropriate. In the drawings used in the following description, for the sake of clarity of the features of the present invention, there are cases where characteristic portions are enlarged for the sake of convenience, sometimes the dimensional ratio of each component is different from the actual. The materials, dimensions, and the like exemplified in the following description are merely examples, and the present invention is not limited thereto, and can be carried out by appropriately changing and modifying the configurations without changing the scope of the present invention.

The electrochemical device includes a primary battery, a secondary battery, a capacitor, and an electric double layer capacitor (EDLC). Further, it includes a liquid type battery, a capacitor, and the like containing a solid electrolyte therein. Hereinafter, a solid-state battery will be described as an example of an electrochemical device.

FIG. 1 is a cross-sectional schematic view showing an enlarged main part of a solid-state battery according to the first embodiment. As shown in FIG. 1, the solid-state battery 10 includes a laminated body 4 having a first electrode layer 1, a second electrode layer 2, and a solid electrolyte 3.

The first electrode layer 1 is connected to the first external terminal 5, and the second electrode layer 2 is connected to the second external terminal 6. The first external terminal 5 and the second external terminal 6 are electrical contact points with the outside.

(Laminated Body)

The laminated body 4 has the first electrode layer 1, the second electrode layer 2, and the solid electrolyte 3. Either one of the first electrode layer 1 or the second electrode layer 2 functions as a positive electrode and the other serves as a negative electrode. The positive and negative of the electrode layer change depending on which polarity is connected to the external terminal. Hereinafter, in order to facilitate understanding, the first electrode layer 1 is used as the positive electrode layer 1 And the second electrode layer 2 is used as the negative electrode layer 2.

In the laminated body 4, the positive electrode layer 1 And the negative electrode layer 2 are alternately laminated via the solid electrolyte 3. Charging and discharging of the solid-state battery 10 is performed by exchanging lithium ions between the positive electrode layer 1 And the negative electrode layer 2 via the solid electrolyte 3.

The laminated body 4 contains water. The water content contained in the laminated body 4 is preferably 0.001 mass % or more and less than 0.3 mass %, more preferably 0.01 mass % or more and less than 0.3 mass % with respect to the mass of the laminated body 4 by mass, and more preferably from 0.07 mass % or more and 0.25 mass % or less.

When the water in the above range is contained in the laminated body 4, it is possible to reduce the internal resistance of the laminated body 4 and deepen the charge depth.

"Charging depth" is an index of whether or not it can be charged to a high capacity with a high voltage. If the depth of charge is deep, high capacity charging is possible even when high voltage is applied. On the other hand, if the charging depth is shallow; when a high voltage is applied, the behavior of the voltage becomes unstable and high capacity charging cannot be performed.

Figure 2:
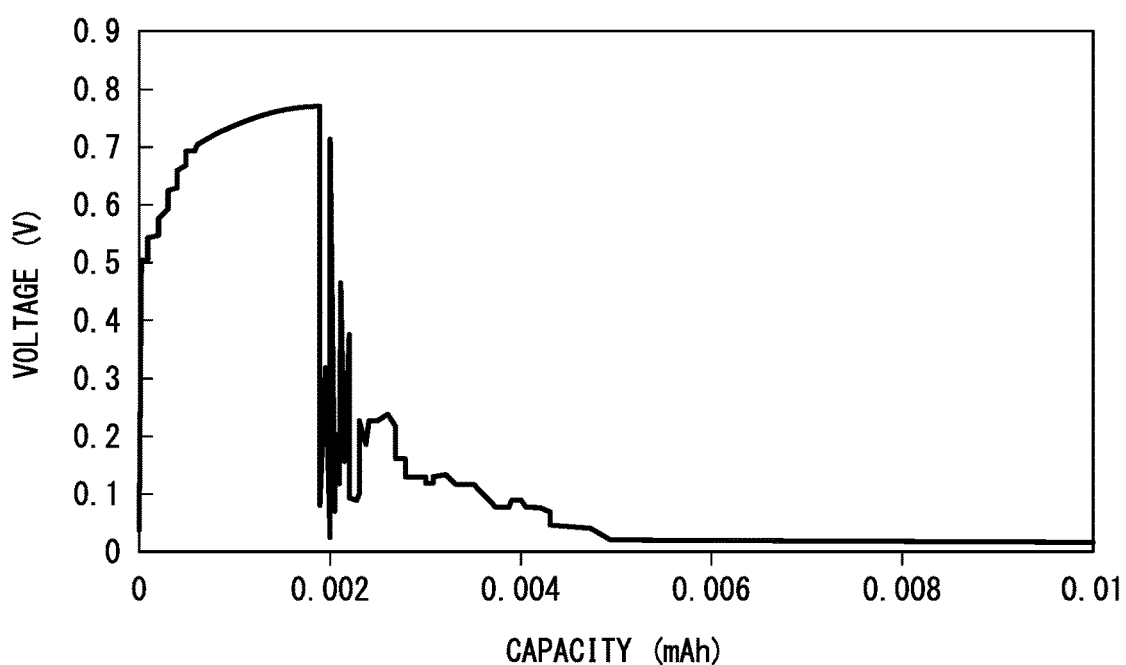
FIG. 2 is a diagram showing a charge depth of a solid-state battery having a shallow charge depth.

FIG. 2 is a diagram showing charging characteristics of a solid-state battery having a shallow charge depth. The vertical axis is the voltage applied to all solid state batteries, and the horizontal axis is the capacity to be charged. Capacity is the product of current and time, indicating that a constant current is applied for a fixed time. As shown in FIG. 2, in a solid-state battery having a small charge depth, the voltage behavior becomes unstable when charging is performed above a certain capacity. In the solid-state battery shown in FIG. 2, when a voltage was applied up to 0.8 V, the voltage behavior became unstable and only the capacity of 0.002 mAh could be charged. Considering practical use, it is desirable that stable charging be possible even if a voltage of 1.8V or more is applied.

The reason why the depth of depletion becomes deep when the predetermined water is contained in the laminated body 4 has not yet been clarified. However, the following reasons are conceivable.

The solid-state battery 10 is obtained by forming the laminated body 4 and then calcining it. Ideally, the laminated body 4 is completely and uniformly baked, but resistive components sometimes concentrate on a part of the laminated body 4. If there is a non-uniform resistance component in the laminated body 4, the applied state of the voltage becomes non-uniform, and a portion where a large voltage is locally applied occurs. A local high voltage may cause a partial short circuit of the solid-state battery 10. When a partial short circuit occurs in the solid-state battery 10, the behavior of the voltage becomes unstable.

When water is impregnated, there is a possibility that unnecessary resistance components locally concentrated are washed away. As a result, the applied state of the voltage may be made uniform in the in-plane direction of the laminated body 4, and the charging depth may be high. In addition, ion conductivity in the laminated body is performed through water, so that ionic conductivity may decrease and the depth of charge may be high.

Based on this point, it is important to impregnate with water, and it seems that water content does not become a problem. However, if the amount of water contained in the laminated body 4 is too large, a part of the inside of the laminated body 4 is not locally short-circuited, and the solid-state battery 10 is short-circuited so that it may not be driven as a battery. Whether or not the battery is short-circuited depends on whether the current detour is formed by the impregnated water, and is determined probabilistically. In other words, if the water content is too large, defective products that do not have a sufficient charge depth probabilistically may occur. That is, the production yield (product removal efficiency) of the product lowers.

In other words, rather than driving the solid-state battery 10 in a state where the laminated body 4 is immersed in the water, it is required to drive the solid-state battery 10 in a state where the predetermined water amount is contained in the laminated body 4.

It is preferable that a part of the water contained in the laminated body 4 exists in the state of bound water that binds to the laminated body 4. It is considered that bound water is bound to the constituent of the laminated body 4 at the molecular level.

When the water contained in the laminated body 4 exists in the state of bound water, the change in the water amount with the lapse of time decreases. For example, the water content does not fluctuate greatly without covering its surrounding with a battery case or the like. In other words, the laminated body 4 can be maintained in a stable state, and the internal resistance can be reduced more stably.

In addition, by existence as bound water, concentration gradients of devices of the active material and the solid electrolyte may be formed in a portion where bound water exists and in other portions. When an device concentration gradient is present, ions are conducted along the concentration gradient and the ion conductivity is increased. As a result, the internal resistance of the solid-state battery 10 is further reduced.

Whether or not it is "bound water" is confirmed by measuring the mass spectrum of the laminated body 4 containing water. Heat the laminated body 4 in a vacuum and measure the detection amount of a substance having an m/z value of 18 (that is, $H_2O$) while gradually increasing the temperature. Since bound water is bound to constituent molecules of the laminated body 4, it is not desorbed at a temperature of 100° C. or lower. On the other hand, adsorbed water merely adsorbed on the laminated body 4 is desorbed at a temperature of 100° C. or less. Therefore, presence or absence of "bound water" can be confirmed by the presence or absence of water desorbed at a temperature of 100° C. or higher. The ratio of adsorbed water and bound water of water contained in the laminated body 4 can also be determined.

The content of bound water in the laminated body 4 is preferably 0.005 mass % or more and 0.2 mass % or less, more preferably 0.04 mass % or more and 0.18 mass % or less with respect to the mass of the laminated body 4. Further, it is more preferable that the proportion occupied by bound water in the water contained in the laminated body 4 is 50% or more and 90% or less. Even more preferable proportion of bound water is 65% or more and 90% or less.

By the presence of bound water within the laminated body 4 within this range, it is possible to more stably obtain the solid-state battery 10 having a deep charge depth.

"Positive Electrode Layer and Negative Electrode Layer"

The positive electrode layer 1 has a positive electrode current collector layer 1A and a positive electrode active material layer 1B including a positive electrode active material. The negative electrode layer 2 includes a negative electrode current collector layer 2A and a negative electrode active material layer 2B including a negative electrode active material.

It is preferable that the positive electrode current collector layer 1A and the negative electrode current collector layer 2A have high conductivity. Therefore, for example, silver, palladium, gold, platinum, aluminum, copper, nickel or the like is preferably used for the positive electrode collector layer 1A and the negative electrode collector layer 2A. Among these substances, copper hardly reacts with the positive electrode active material, the negative electrode active material and the solid electrolyte. Therefore, when copper is used for the positive electrode collector layer 1A and the negative electrode collector layer 2A, the internal resistance of the solid-state battery 10 can be reduced. The materials constituting the positive electrode current collector layer 1A and the negative electrode current collector layer 2A may be the same or different.

The positive electrode active material layer 1B is formed on one side or both sides of the positive electrode collector layer 1A. For example, in the positive electrode layer 1 located at the uppermost layer in the lamination direction of the solid-state battery 10, there is no facing negative electrode layer 2. Therefore, in the positive electrode layer 1 located at the uppermost layer of the solid-state battery 10, the positive electrode active material layer 1B may be provided only on one side of the lower side in the lamination direction. Like the positive electrode active material layer 1B, the negative electrode active material layer 2B is also formed on one or both surfaces of the anode current collector layer 2A.

The positive electrode active material layer 1B and the negative electrode active material layer 2B include a positive electrode active material and a negative electrode active material that exchange electrons. In addition, a conductive additive, a binder, or the like may be contained. It is preferable that the positive electrode active material and the negative electrode active material can efficiently insert and desorb lithium ions.

For the positive electrode active material and the negative electrode active material, for example, it is preferable to use a transition metal oxide or a transition metal composite oxide. Specifically, lithium manganese complex oxide $Li_2Mn_aMa_{1-a}O_3$ ($0.8 \le a \le 1$, Ma=Co, Ni); lithium cobalt oxide ($LiCoO_2$); lithium nickel oxide ($LiNiO_2$); lithium manganese spinel ($LiMn_2O_4$); a composite metal oxide represented by a general formula, $LiNi_xCo_yMn_zO_2$ ($x+y+z=1$, $0 \le x \le 1$, $0 \le y \le 1$, $0 \le z \le 1$); lithium vanadium compound ($LiV_2O_5$); olivine type $LiMbPO_4$ (Mb being one or more devices selected from Co, Ni, Mn, Fe, Mg, Nb, Ti, Al and Zr); lithium vanadium phosphate ($Li_3V_2(PO_4)_3$ or $LiVOPO_4$); an excessively lithium-based solid solution positive electrode represented by $Li_2MnO_3$—$LiMcO_2$ (Mc=Mn, Co, Ni); lithium titanate ($Li_4Ti_5O_{12}$); a composite metal oxide represented by $Li_sNi_tCo_uAl_vO_2$ ($0.9<s<1.3$, $0.9<t+u+v<1.1$) or like can be used.

Further, the negative electrode active material and the positive electrode active material may be selected in accordance with the solid electrolyte 3 to be described later. For example, in a case where titanium aluminum phosphate lithium phosphate $Li_fAl_gTi_hP_iO_{12}$ (f, g, h and i satisfy $0.5 \le f \le 3.0$, $0.09 \le g \le 0.50$, $1.40 \le h \le 2.00$, $2.80 \le i \le 3.20$, respectively), it is preferable to use one or both of $LiVOPO_4$ and $Li_3V_2(PO_4)_3$ for the positive electrode active material and the negative electrode active material. The bonding at the interface between the positive electrode active material layer 1B and the negative electrode active material layer 2B and the solid electrolyte 3 becomes strong. In addition, the contact area at the interface between the positive electrode active material layer 1B and the negative electrode active material layer 2B and the solid electrolyte 3 can be increased.

There is no clear distinction between the active materials constituting the positive electrode active material layer 1B or the negative electrode active material layer 2B. By comparing the potentials of the two kinds of compounds, a compound exhibiting a nobler potential is used as the positive electrode active material and a compound exhibiting a low potential can be used as a negative electrode active material.

In addition, the positive electrode current collector layer 1A and the negative electrode current collector layer 2A may include a positive electrode active material and a negative electrode active material, respectively. The content ratio of the active material contained in each current collector is not particularly limited as long as it functions as a current collector. For example, it is preferable that the positive electrode current collector/positive electrode active material or the negative electrode current collector/negative electrode active material be in a volume ratio of 90/10 to 70/30.

By containing the positive electrode active material and the negative electrode active material respectively in the positive electrode current collector layer 1A and the negative electrode current collector layer 2A, respectively, adhesiveness is improved between the positive current collector layer 1A and the positive electrode active material layer 1B and the negative currently collector layer 2A and the negative active material layer 2B.

"Solid Electrolyte"

The solid electrolyte 3 is preferably a phosphate-based solid electrolyte (a phosphate solid electrolyte). Further, as the solid electrolyte 3, it is preferable to use a material having low electron conductivity and high lithium ion conductivity.

For example, it is preferable that the solid electrolyte 3 is made of at least one selected from group consisting of: a perovskite type compound such as $La_{0.5}Li_{0.5}TiO_3$ and the like; a LISICON type compound such as $Li_{14}Zn(GeO_4)_4$; a garnet type compound such as $Li_7La_3Zr_2O_{12}$; lithium titanium aluminum phosphate $Li_fAl_gTi_hP_iO_{12}$ (f, g, h and i satisfy $0.5 \leq f \leq 3.0$, $0.09 \leq g \leq 0.50$, $1.40 \leq h \leq 2.00$, and $2.80 \leq i \leq 3.20$, respectively); a NASICON type compound such as $Li_{1.5}Al_{0.5}Ge_{1.5}(PO_4)_3$; a thio-LISICON type compound such as $Li_{3.25}Ge_{0.25}P_{0.75}S_4$ and $Li_3PS_4$; a glass compound such as $Li_2S-P_2S_5$ and $Li_2O-V_2O_5-SiO_2$; and a phosphate compound such as $Li_3PO_4$, $Li_{3.5}Si_{0.5}P_{0.5}O_4$ or $Li_{2.9}PO_{3.3}N_{0.46}$.

(Terminal)

It is preferable to use a material having a high conductivity for the first external terminal 5 and the second external terminal 6 of the solid-state battery 10. For example, silver, gold, platinum, aluminum, copper, tin, nickel can be used. The first external terminal 5 and the second external terminal 6 may be a single layer or a plurality of layers.

(Protective Layer)

The solid-state battery 10 may have a protective layer on the outer periphery of the laminated body 4 for protecting the laminated body 4 and terminals electrically, physically and chemically. As a material constituting the protective layer, it is preferable that it is excellent in insulating property, durability, water resistance, and environmental safety. For example, it is preferable to use glass, ceramics, thermosetting resin or photo curable resin. The material of the protective layer may be one type alone or a plurality of materials may be used in combination. Although the protective layer may be a single layer, it is preferable to have a plurality of layers. Among them, an organic-inorganic hybrid in which a thermosetting resin and a ceramic powder are mixed is particularly preferable.

(Method of Manufacturing All-Solid Cell)

A method of manufacturing the solid-state battery 10 may use a simultaneous calcining method or a sequential calcining method.

The simultaneous calcining method is a method of laminating materials for forming each layer and batch calcining to produce a laminated body. The sequential calcining method is a method of preparing each layer in order, and a calcining step is performed each time each layer is formed. Using the simultaneous calcining method can reduce the number of working steps of the solid-state battery 10. Further, when the simultaneous calcining method is used, the obtained laminated body 4 becomes dense. Hereinafter, the simultaneous calcining method will be described as an example.

The simultaneous calcining method includes a step of preparing a paste of each material constituting the laminated body 4, a step of coating and drying the paste to prepare a green sheet, a step of laminating the green sheets and simultaneously calcining the produced laminated sheet.

First, the materials of the positive electrode collector layer 1A, the positive electrode active material layer 1B, the solid electrolyte 3, the negative electrode active material layer 2B, and the negative electrode collector layer 2A constituting the laminated body 4 are made into a paste.

The method of pasting is not particularly limited. For example, a powder is mixed with a vehicle to obtain a paste. Here, the vehicle is a generic name of a medium in a liquid phase. The vehicle includes a solvent and a binder. By such a method, a paste for the positive electrode current collector layer 1A, a paste for the positive electrode active material layer 1B, a paste for the solid electrolyte 3, a paste for the negative electrode active material layer 2B, and a paste for the negative electrode current collector layer 2A are prepared.

Next, a green sheet is prepared. The green sheet is obtained by applying the prepared paste onto a base material such as PET (polyethylene terephthalate) in a desired order, drying if necessary, and peeling the base material. The paste application method is not particularly limited. For example, known methods such as screen printing, coating, transfer, doctor blade and the like can be adopted.

Each of the prepared green sheets is laminated in a desired order and in a laminated number. If necessary, alignment, cutting, etc. are performed to prepare a laminated body. In the case of preparing a parallel type or series parallel type battery, it is preferable to perform alignment so that the end face of the positive electrode current collector layer does not coincide with the end face of the negative electrode current collector layer and laminated.

In preparing the laminated body, a laminated body may be prepared by preparing a positive electrode active material layer unit and a negative electrode active material layer unit as described below.

First, a paste for the solid electrolyte 3 is formed as a sheet on a PET film by a doctor blade method and dried to form a solid electrolyte layer 3. A paste for the positive electrode active material layer 1B is printed on the obtained solid electrolyte 3 by screen printing and dried to form the positive electrode active material layer 1B.

Subsequently, the paste for the positive electrode collector layer 1A is printed on the prepared paste for the positive electrode active material layer 18 by screen printing and dried to form the positive electrode collector layer 1A. The paste for the positive electrode active material layer 1B is reprinted on the obtained positive electrode collector layer 1A by screen printing and dried to form the positive electrode active material layer 1B. Then, the PET film is peeled off to prepare a positive electrode active material layer unit. In the positive electrode active material layer unit, the solid electrolyte layer 3/the positive electrode active material layer 1B/the positive electrode current collector layer 1A/the positive electrode active material layer 1B are laminated in this order.

A negative electrode active material layer unit is also prepared in the same procedure. In the negative electrode active material layer unit, the solid electrolyte layer 3/the negative electrode active material layer 2B the negative electrode current collector layer 2A/the negative electrode active material layer 2B are laminated in this order.

One positive electrode active material layer unit and one negative electrode active material layer unit are laminated. At this time, lamination is performed in such a way that: the solid electrolyte layer 3 of the positive electrode active material layer unit and the negative electrode active material layer 2B of the negative electrode active material layer unit are contacted to each other; or the positive electrode active material layer 1B of the positive electrode active material layer unit and the solid electrolyte layer 3 of the negative electrode active material layer unit are contacted to each other. Thereby, the lamination body, in which the positive electrode active material layer 1B/the positive electrode current collector layer 1A/the positive electrode active material layer 1B/the solid electrolyte layer 3/the negative electrode active material layer 2B/the negative electrode current collector layer 2A/the negative electrode active material layer 2B/the solid electrolyte layer 3 are laminated in this order, is obtained. Each of units are laminated displaced to each other in such a way that the positive electrode current collector layer 1A of the first positive electrode active material layer unit extends only on one end face and the negative electrode current collector layer 2A of the second negative electrode active material layer unit extends only to the other face. A sheet for the solid electrolyte layer 3 having a predetermined thickness is further laminated on both sides of the laminated unit to prepare a laminated body.

The produced laminated body is pressure bonded all at once. The crimping is performed while heating, and the heating temperature is, for example, 40 to 95° C.

The crimped green sheet laminated body is heated at 500° C. to 750° C. in nitrogen, hydrogen and steam atmosphere, for example, to remove binder. Thereafter, the calcined body is obtained by heating at 600° C. to 1000° C. in an atmosphere of nitrogen, hydrogen and steam and calcining it. The calcination time is, for example, 0.1 to 3 hours.

The calcined body may be placed in a cylindrical container together with an abrasive such as alumina and barrel polished. This makes it possible to chamfer corners of the laminated body. Alternatively, polishing may be performed by sandblasting. This method is preferable because only a specific portion can be removed.

(Terminal Formation)

The first external terminal 5 and the second external terminal 6 are attached to the calcined body 4. The first external terminal 5 and the second external terminal 6 are formed so as to make electrical contact with the positive electrode current collector layer 1A and the negative electrode current collector layer 2A, respectively. For example, it can be formed by using a known method such as a sputtering method, a dipping method, a spray coating method or the like for the positive electrode current collector layer 1A and the negative electrode current collector layer 2A exposed from the side surface of the calcined body 4. When it is formed only in a predetermined portion, it is formed by masking or the like with a tape, for example.

Although the embodiments of the present invention have been described above in detail with reference to the drawings, the respective configurations and combinations thereof in the respective embodiments are merely examples, and additions and omissions of configurations are possible within the scope not departing from the scope of the present invention. Substitutions, and other changes are possible.

EXAMPLES

Comparative Example 1

The laminated body 4 was produced by a simultaneous calcining method. The composition of each layer was as follows.

Positive electrode current collector layer 1A and negative electrode current collector layer 2A: $Cu+Li_{2.55}V_{1.50}Al_{0.05}Ti_{0.45}P_{3.00}O_{12}$ Positive electrode active material layer 1B and negative electrode active material layer 2B: $Li_{2.55}V_{1.50}Al_{0.05}Ti_{0.45}P_{3.00}O_{12}$ Solid electrolyte 3: $Li_{1.00}V_{0.05}Al_{0.12}Ti_{1.7}P_{3.00}O_{12}$ The temperature at the time of simultaneous calcining was 800° C., and the calcining time was 1 hour.

An InGa electrode paste was applied to the end face of the laminated body 4 immediately after calcining to form a terminal electrode, and a solid-state lithium rechargeable battery was fabricated.

Example 1

Example 1 is different from Comparative Example 1 in that terminal electrodes were formed after leaving the laminated body stand for 12 hours in a thermo-hygrostat bath at 25° C. and 50% humidity after calcining. Other conditions were the same as in Comparative Example 1.

Example 2

In Example 2, first, the calcined laminated body was left stand in a thermo-hygrostat at a temperature of 25° C. and a humidity of 90% for 30 minutes and then left stand in a thermo-hygrostat at 25° C. and 50% humidity for 1 week. Then, terminal electrodes were formed on the laminated body taken out from the thermo-hygrostat. Example 2 differs from Comparative Example 1 only in the above-described procedures, and other conditions were the same as in Comparative Example 1.

Example 3

In Example 3, first, the calcined laminated body was left stand for 2 hours in a thermo-hygrostat at a temperature of 25° C. and a humidity of 90%, and then left in a thermo-hygrostat at a temperature of 25° C. and a humidity of 50% for 1 week. Then, terminal electrodes were formed on the laminated body taken out from the thermo-hygrostat. Example 3 differs from Comparative Example 1 only in the above-described procedures, and other conditions were the same as in Comparative Example 1.

Example 4

In Example 4, first, the calcined laminated body was first immersed in pure water for 30 minutes, and then the laminated body taken out from the pure water was left stand in a thermo-hygrostat at a temperature of 25° C. and a humidity of 50% for 1 week. Then, terminal electrodes were formed on the laminated body taken out from the thermo-hygrostat. Example 4 differs from Comparative Example 1 only in the above-described procedures, and other conditions were the same as in Comparative Example 1.

Example 5

In Example 5, first, the calcined laminated body was first left stand in a thermo-hygrostat at a temperature of 25° C. and a humidity of 90% for 24 hours, and then further left stand in a thermo-hygrostat at a temperature of 25° C. and a humidity of 50% for 1 week. Then, terminal electrodes were formed on the laminated body taken out from the thermo-hygrostat. Example 5 differs from Comparative Example 1 only in the above-described procedures, and other conditions were the same as in Comparative Example 1.

Example 6

In Example 6, first, the calcined laminated body was first immersed in pure water for 1 hour, and then the laminated body taken out from the pure water was left stand for 1 week in a thermo-hygrostat at a temperature of 25° C. and a humidity of 50%. Then, terminal electrodes were formed on the laminated body taken out from the thermo-hygrostat. Example 6 differs from Comparative Example 1 only in the above-described procedures, and other conditions were the same as in Comparative Example 1.

Example 7

In Example 7, first, the calcined laminated body was first immersed in pure water for 2 hours, and then the laminated body taken out from pure water was left stand in a thermo-hygrostat at a temperature of 25° C. and a humidity of 50% for 1 week. Then, terminal electrodes were formed on the laminated body taken out from the thermo-hygrostat. Example 7 differs from Comparative Example 1 only in the above-described procedures, and other conditions were the same as in Comparative Example 1.

Example 8

In Example 8, first, the calcined laminated body was left stand in a thermo-hygrostat at a temperature of 25° C. and a humidity of 90% for 3 days, and then left stand in a thermo-hygrostat at a temperature of 25° C. and a humidity of 50% for 1 week. Then, terminal electrodes were formed on the laminated body taken out from the thermo-hygrostat. Example 8 differs from Comparative Example 1 only in the above-described procedures, and other conditions were the same as in Comparative Example 1.

Example 9

In Example 9, first, the calcined laminated body was first immersed in pure water for 5 hours, and the laminated body taken out from the pure water was left stand for 30 minutes in a thermo-hygrostat at a temperature of 25° C. and a humidity of 50%. Then, terminal electrodes were formed on the laminated body taken out from the thermo-hygrostat. Example 9 differs from Comparative Example 1 only in the above-described procedures, and other conditions were the same as in Comparative Example 1.

Comparative Example 2

In Comparative Example 2, first, the calcined laminated body was immersed in pure water for 12 hours. Then, terminal electrodes were formed on the laminated body taken out from pure water. Comparative Example 2 differs from Comparative Example 1 only in the above-described procedures, and other conditions were the same as in Comparative Example 1.

Comparative Example 3

In Comparative Example 3, first, the calcined laminated body was first immersed in pure water for 24 hours. Then, terminal electrodes were formed on the laminated body taken out from pure water. Comparative Example 3 differs from Comparative Example 1 only in the above-described procedures, and other conditions were the same as in Comparative Example 1.

Twenty samples corresponding to each of Examples 1 to 9 and Comparative Examples 1 to 3 were prepared. In each of the fabricated devices, it was determined whether or not the battery could be charged to 1.8V and the discharge capacity was measured. As to whether or not charging was possible, the charge depth of the solid-state battery was measured in the same manner as in FIG. 2 by using a charge/discharge test apparatus (ACD-01 manufactured by Asuka Electronics). The voltage behavior did not suddenly drop as shown in FIG. 2 in ones capable of being charged. The water content and the ratio of the bound water in each laminated body were measured. Measurement was carried out from room temperature to 300° C. using a TDS measuring device (EM)-WA1000, manufactured by Electronic Science Co., Ltd.) for measuring the water content. The results are shown in Table 1. In Table 1, "Average Discharge Capacity" indicates the average value of the discharge capacity of the sample that could be charged to 1.8V.

TABLE 1

| | Water content (wt %) | Number of battery samples charged to 1.8 V (n = 20) | Bound water (wt %) | (Bound water)/ (Water content) (%) | Average discharge capacity (μ Ah) |
|---|---|---|---|---|---|
| Comparative Example 1 | 0.00052 | 0 | 0.00015 | 29 | 0 |
| Example 1 | 0.0014 | 1 | 0.0006 | 43 | 5 |
| Example 2 | 0.014 | 3 | 0.0065 | 46 | 20 |
| Example 3 | 0.023 | 6 | 0.011 | 48 | 35 |
| Example 4 | 0.077 | 14 | 0.043 | 56 | 85 |
| Example 5 | 0.089 | 20 | 0.072 | 81 | 112 |
| Example 6 | 0.11 | 20 | 0.08 | 73 | 104 |
| Example 7 | 0.12 | 20 | 0.081 | 68 | 105 |
| Example 8 | 0.25 | 13 | 0.18 | 72 | 95 |
| Example 9 | 0.29 | 5 | 0.14 | 48 | 55 |
| Comparative Example 2 | 0.43 | 0 | 0.21 | 49 | 0 |
| Comparative Example 3 | 0.52 | 0 | 0.23 | 44 | 0 |

All twenty solid-state batteries fabricated under the conditions of Comparative Examples 1 to 3 were unable to charge up to 1.8V. In Comparative Example 1, the behavior of the voltage became unstable in the process of increasing the voltage. It is interpreted that a local short circuit occurred in part due to the non-uniformity of the resistance component in the solid-state battery. In contrast, in Comparative Examples 2 and 3, it is interpreted that a short circuit was caused by excessive water.

In contrast, solid-state batteries fabricated under the conditions of Examples 1 to 9 were capable of charging up to 1.8V. In addition, when the proportion of bound water in the water contained in the laminated body was 50% or more and 90% or less, charging was able to be carried out particularly stably.

Further, one of each of the twenty manufactured in Examples 1 to 9 and Comparative Examples 1 to 3 was arbitrarily selected, and cycle characteristics were measured. Cycle characteristics were evaluated by repeating charging and discharging of the device 100 times, and it was confirmed whether charging/discharging was possible or not.

In the solid-state battery fabricated under the conditions of Comparative Examples 1 to 3, there was no device capable of charging up to 1.8V. For this reason, examination of the cycle characteristics was carried out by applying a voltage of 0.7V. Solid-state batteries fabricated under the conditions of Examples 1 to 9 and Comparative Example 1 were able to stably charge and discharge even after 100 charge/discharge cycles. On the other hand, in the solid-state battery fabricated under the condition of Comparative Example 2 could not be charged and discharged at the twelfth time; and the solid-state battery fabricated under the conditions of the twelfth and the comparative example 3 could not be charged and discharged at the fifth time.

It is interpreted that solid-state batteries fabricated under the conditions of Comparative Examples 2 and 3 had a large amount of water to be impregnated, and the solid-state batteries stopped stochastically due to water.

On the other hand, solid-state batteries fabricated under the conditions of Examples 1 to 9 were able to continue charging and discharging even when charging/discharging 100 times at a voltage of 1.8V, which was assumed to be practical value. That is, solid-state batteries fabricated under the conditions of Examples 1 to 9 can stably charge and discharge.

INDUSTRIAL APPLICABILITY

It is possible to provide a lithium ion rechargeable battery with higher performance than the conventional one. In using the lithium ion rechargeable battery provided, there is no risk of leakage and its operation can be maintained even if a high voltage is applied.

BRIEF DESCRIPTION OF THE REFERENCE SYMBOLS

1: Positive electrode layer
1A: Positive electrode current collector
1B: Positive electrode active material layer
2: Negative electrode layer
2A: Negative electrode current collector
2B: Negative electrode active material layer
3: Solid electrolyte
4: Laminated body
5: First external terminal
6: Second external terminal

The invention claimed is:

1. An electrochemical device comprising laminated body including:
   a positive electrode;
   a negative electrode; and
   a solid electrolyte sandwiched between the positive electrode and the negative electrode, wherein
   the laminated body contains water,
   a content of the water contained in the laminated body is 0.001 mass % or more and less than 0.3 mass % with respect to the laminated body,
   a part of the water is a bound water bonding with a constituent of the laminated body, and
   a ratio of the bound water in the water is 50% or more and 90% or less.

2. The electrochemical device according to claim 1, wherein the content of the water contained in the laminated body is 0.07 mass % or more and 0.25 mass % or less with respect to the laminated body.

3. The electrochemical device according to claim 2, wherein the content of the bound water is 0.04 mass % or more and 0.18 mass % or less.

4. The electrochemical device according to claim 3, wherein the ratio of the bound water in the water is 65% or more and 90% or less.

5. The electrochemical device according to claim 4, wherein the solid electrolyte is a phosphate solid electrolyte.

6. The electrochemical device according to claim 3, wherein the solid electrolyte is a phosphate solid electrolyte.

7. The electrochemical device according to claim 2, wherein the ratio of the bound water in the water is 65% or more and 90% or less.

8. The electrochemical device according to claim 7, wherein the solid electrolyte is a phosphate solid electrolyte.

9. The electrochemical device according to claim 2, wherein the solid electrolyte is a phosphate solid electrolyte.

10. The electrochemical device according to claim 1, wherein the content of the bound water is 0.005 mass % or more and 0.2 mass % or less.

11. The electrochemical device according to claim 10, wherein the ratio of the bound water in the water is 65% or more and 90% or less.

12. The electrochemical device according to claim 11, wherein the solid electrolyte is a phosphate solid electrolyte.

13. The electrochemical device according to claim 10, wherein the solid electrolyte is a phosphate solid electrolyte.

14. The electrochemical device according to claim 1, wherein the ratio of the bound water in the water is 65% or more and 90% or less.

15. The electrochemical device according to claim 14, wherein the solid electrolyte is a phosphate solid electrolyte.

16. The electrochemical device according to claim 1, wherein the solid electrolyte is a phosphate solid electrolyte.

17. A solid-state lithium ion rechargeable battery comprising the electrochemical device according to claim 1.

18. The solid-state lithium ion rechargeable battery comprising the electrochemical device according to claim 17, wherein relative densities of: a pair of a positive electrode layer and a negative electrode layer; and a solid electrolyte layer provided between the pair of the electrode layers are 80% or more.

* * * * *